(12) United States Patent
Masahiko

(10) Patent No.: US 7,369,776 B2
(45) Date of Patent: May 6, 2008

(54) BI-DIRECTIONAL OPTICAL TRANSCEIVER MODULE

(75) Inventor: Tsumori Masahiko, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 513 days.

(21) Appl. No.: 11/005,205

(22) Filed: Dec. 6, 2004

(65) Prior Publication Data
US 2005/0180755 A1    Aug. 18, 2005

(30) Foreign Application Priority Data
Feb. 13, 2004    (KR)    ............... 10-2004-0009521

(51) Int. Cl.
*H04B 10/00*    (2006.01)
(52) U.S. Cl. ............... 398/138; 398/135; 398/139
(58) Field of Classification Search ............ 398/135, 398/138, 139, 128, 130
See application file for complete search history.

(56) References Cited
U.S. PATENT DOCUMENTS

| 5,408,559 | A |   | 4/1995  | Takahashi et al. | ............ 385/89 |
| 6,142,680 | A | * | 11/2000 | Kikuchi et al.   | ............ 385/93 |
| 6,652,158 | B2| * | 11/2003 | Bartur et al.    | ............ 385/92 |

FOREIGN PATENT DOCUMENTS

| JP | 63-73707  | 5/1988 |
| JP | 03-164703 | 7/1991 |
| JP | 11-023916 | 1/1999 |
| JP | 11-052192 | 2/1999 |

* cited by examiner

*Primary Examiner*—Kenneth Vanderpuye
*Assistant Examiner*—Daniel G Dobson
(74) *Attorney, Agent, or Firm*—Cha & Reiter, LLC

(57) ABSTRACT

A bi-directional optical transceiver module includes an optical transmitter, and an optical receiver, which have a TO-can structure, and generates a first optical signal and detects a second optical signal, respectively. A housing includes a first receiving section that receives the optical transmitter. A second receiving section is arranged opposite the first receiving section, a third receiving section is arranged below the first and second receiving sections, and a fourth receiving section is arranged opposite the third receiving section. The receiving stations communicate through holes between the first through fourth receiving sections. An optical fiber ferrule in the second receiving section supports an optical fiber to input the second optical signal into the bi-directional optical transceiver module. A block received in the fourth receiving section and reflects the second optical signal received from the optical fiber at a predetermined angle with respect to an optical path of the first optical signal.

13 Claims, 5 Drawing Sheets

BI-DIRECTIONAL OPTICAL TRANSCEIVER MODULE

CLAIM OF PRIORITY

This application claims priority to an application entitled "BI-DIRECTIONAL OPTICAL TRANSCEIVER MODULE," filed in the Korean Intellectual Property Office on Feb. 13, 2004 and assigned Serial No. 2004-9521, the contents of which are hereby incorporated by reference.

BACKGROUND OF THE INVENTION

1. Field of the Invention

The present invention relates to a bi-directional optical transceiver module, and more particularly to a bi-directional optical transceiver module including an optical transmitter and an optical receiver, each of which having a TO-can structure.

2. Description of the Related Art

A bi-directional optical transceiver module performs transmission and reception of optical signals having different wavelengths. Conventional bi-directional optical transceiver modules have a structure in which an optical transmitter and an optical receiver are mounted in a single housing or on a single substrate.

The optical transmitter and optical receiver included in such a bi-directional optical transceiver module may have a butterfly structure or a TO-can structure. Optical transceiver modules, which include an optical transmitter and an optical receiver each having a TO-can structure, are usable for short-distance communication networks because they are inexpensive due to the low manufacturing costs of the TO-can structure.

FIG. 1 is a schematic diagram illustrating the configuration of a conventional bi-directional optical transceiver module. As shown in FIG. 1, the conventional bi-directional optical transceiver module includes an optical transmitter 110, which has a TO-can structure, that generates a first optical signal. The bi-directional optical transceiver module also includes an optical receiver 120, which has a TO-can structure, that detects a received second optical signal. The bi-directional optical transceiver module further includes an optical fiber ferrule 130 to input and output the first and second optical signals. The conventional bi-directional optical transceiver module also includes a filter 160 to divide optical paths of the first and second optical signals, and first through third lens systems 140, 150 and 170 to collimate or converge the first and second optical signals.

Generally, the first and second optical signals use different wavelength bands, respectively. For example, the first optical signal uses a C-band, and the second optical signal uses an L-band, the wavelength space between the first and second optical signals is about 17nm, which is very narrow. As a result, the filter must be aligned to have an angle of not more than 10° with respect to the optical path of the first optical signal.

When the wavelength space between the first and second optical signals is narrow, the second optical signal reflected from the filter forms a very small angle with respect to the optical path of the first optical signal. As a consequence, the optical paths of the first and second optical signals must be lengthened to implement a bi-directional optical transceiver module. This causes an increase in total volume.

FIG. 2 is a schematic diagram illustrating the configuration of another conventional bi-directional optical transceiver module. As shown in FIG. 2, this conventional bi-directional optical transceiver module includes an optical transmitter 210 that generates a first optical signal and an optical receiver 220 that detects a second optical signal. Both the optical transmitter 210 and the optical receiver 220 have a TO-can structure. The bi-directional optical transceiver module also includes an optical fiber ferrule 230, a filter 260, a mirror 280, first through third lens systems 240, 250 and 270 to collimate or converge the first and second optical signals, and a housing 290.

The first lens system 240 collimates the first optical signal, and outputs the collimated first optical signal to the optical fiber ferrule 230. The second lens system 250 converges the first optical signal to one end of the optical fiber 231. The second lens system 250 also collimates the second optical signal, and outputs the collimated second optical signal to the filter 260. The third lens system 270 converges the second optical signal to the optical receiver 220.

The filter 260 is arranged between the optical transmitter 210 and the optical fiber 231 to output the first optical signal generated from the optical transmitter 210 to the optical fiber 231. The filter 260 also reflects the second optical signal received from the optical fiber 231 so that the second optical signal has a predetermined angle with respect to the first optical signal.

The mirror 280 reflects the second optical signal reflected from the filter 260 toward the optical receiver 220. The mirror 280 and filter 260 are aligned with each other in the housing 290 with respect to optical axes thereof. The filter 260 is arranged to have a predetermined angle with respect to the optical path of the first optical signal.

In this arrangement, however, the reflection angle of the second optical signal may vary greatly depending on the alignment error of the filter. Furthermore, since the constituent elements of the bi-directional optical transceiver module are integrally formed in the single housing, it is difficult to easily achieve a desired optical axis alignment. Also, misalignment of optical axes may easily occur during the optical axis alignment process.

SUMMARY OF THE INVENTION

One aspect of the present invention relates to a bi-directional optical transceiver module that can achieve a desired optical alignment and has a small volume.

One embodiment of the present invention is directed to a bi-directional optical transceiver module including an optical transmitter, which has a TO-can structure, that generates a first optical signal, and an optical receiver, which has a TO-can structure, that detects a second optical signal, The module also includes a housing having a first receiving section to receive the optical transmitter, a second receiving section arranged to be opposite to the first receiving section, a third receiving section arranged below the first and second receiving sections to receive the optical receiver, a fourth receiving section arranged to be opposite to the third receiving section, and holes to communicate the first through fourth receiving sections. The module further includes an optical fiber ferrule received in the second receiving section, the optical fiber ferrule including an optical fiber to input the second optical signal into the bi-directional optical transceiver module and to externally output the first optical signal from the bi-directional optical transceiver module and a block received in the fourth receiving section to support a filter to output the first optical signal to the second receiving section and to reflect the second optical signal received from the optical fiber at a predetermined angle with respect to an optical path of the first optical signal, and to support a mirror to reflect the second optical signal reflected from the filter to the optical receiver.

Another embodiment of the present invention is directed to a bi-directional optical transceiver module including an optical transmitter, which has a TO-can structure, that generates a first optical signal and one or more optical receivers, which each have a TO-can structure, that detect second optical signals of different wavelengths, respectively. The module also includes a housing having a first receiving section to receive the optical transmitter, a second receiving section arranged to be opposite to the first receiving section, a third receiving section arranged below the first and second receiving sections to receive the optical receivers, a fourth receiving section arranged to be opposite to the third receiving section, and holes to communicate the first through fourth receiving sections. The module further includes an optical fiber ferrule received in the second receiving section, the optical fiber ferrule including an optical fiber to input the second optical signals into the bi-directional optical transceiver module and to externally output the first optical signal from the bi-directional optical transceiver module and one or more blocks each received in the fourth receiving section to support a filter to output the first optical signal to the second receiving section and to reflect an associated one of the second optical signals received from the optical fiber at a predetermined angle with respect to an optical path of the first optical signal, and to support a mirror to reflect the associated second optical signal reflected from the filter to an associated one of the optical receivers.

Yet another embodiment of the present invention is directed to a bi-directional optical transceiver module including a housing having a plurality of holes, an optical transmitter having a TO-can structure, mounted in the housing, that generates a first optical signal, and an optical receiver having a TO-can structure, mounted in the housing, that detects a second optical signal. The plurality of holes are arranged on optical paths, along which the first and second optical signals travel. The module also includes an optical fiber ferrule, mounted in the housing, the optical fiber ferrule including an optical fiber that inputs the second optical signal into the bi-directional optical transceiver module and outputs the first optical signal from the bi-directional optical transceiver module and a block, mounted in the housing, that supports a filter to output the first optical signal to the second receiving section and reflects the second optical signal received from the optical fiber at a predetermined angle with respect to an optical path of the first optical signal, and supports a mirror to reflect the second optical signal reflected from the filter to the optical receiver.

BRIEF DESCRIPTION OF THE DRAWINGS

The above aspects and embodiments of the present invention will become more apparent by describing in detail embodiments thereof with reference to the attached drawings in which.

DETAILED DESCRIPTION

Now, embodiments of the present invention will be described in detail with reference to the annexed drawings. In the following description of the present invention, a detailed description of known functions and configurations incorporated herein will be omitted when it may obscure the subject matter of the present invention.

Figure 1:
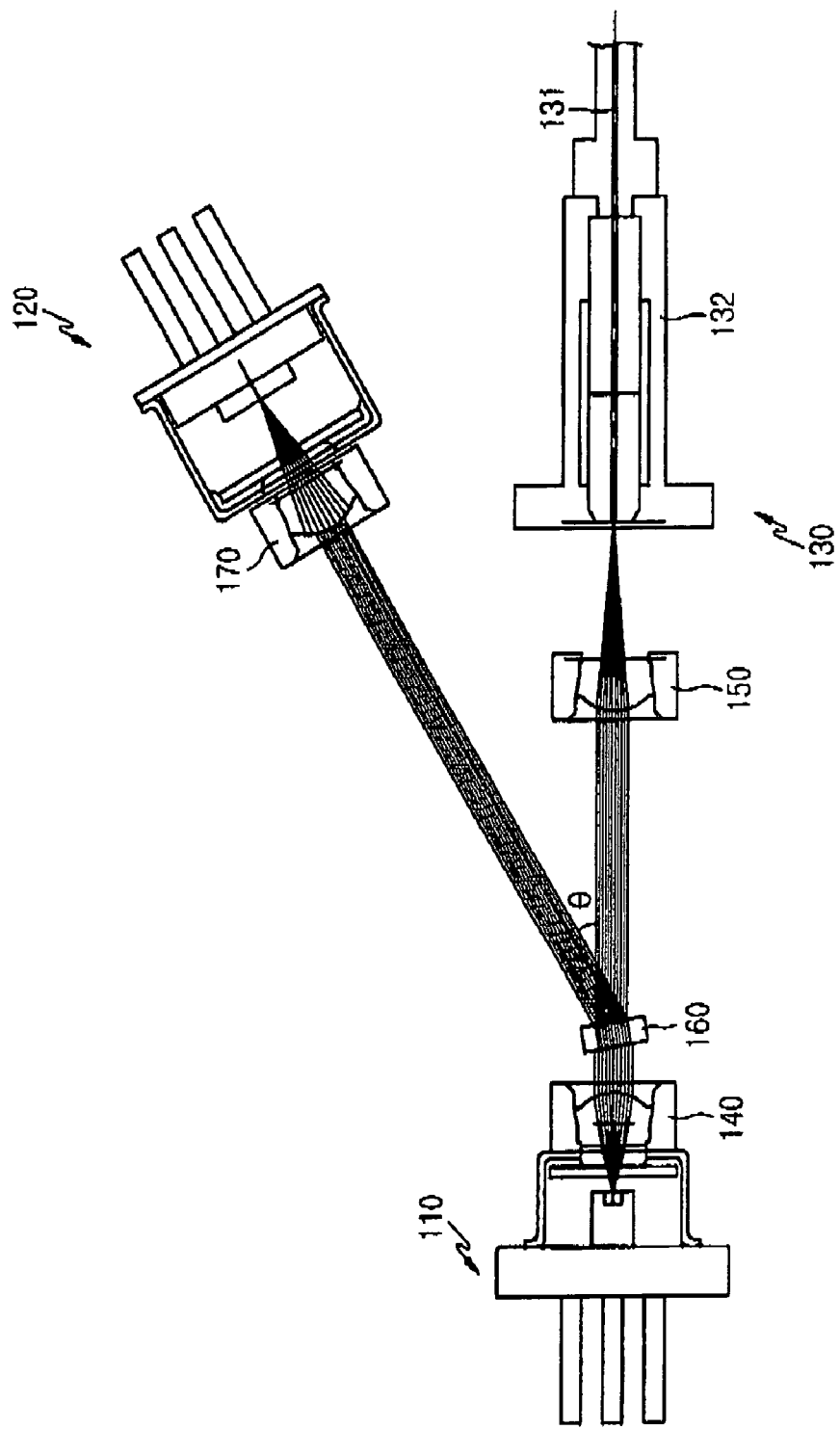
FIG. 1 is a schematic diagram illustrating the configuration of a conventional bi-directional optical transceiver module.
Figure 2:
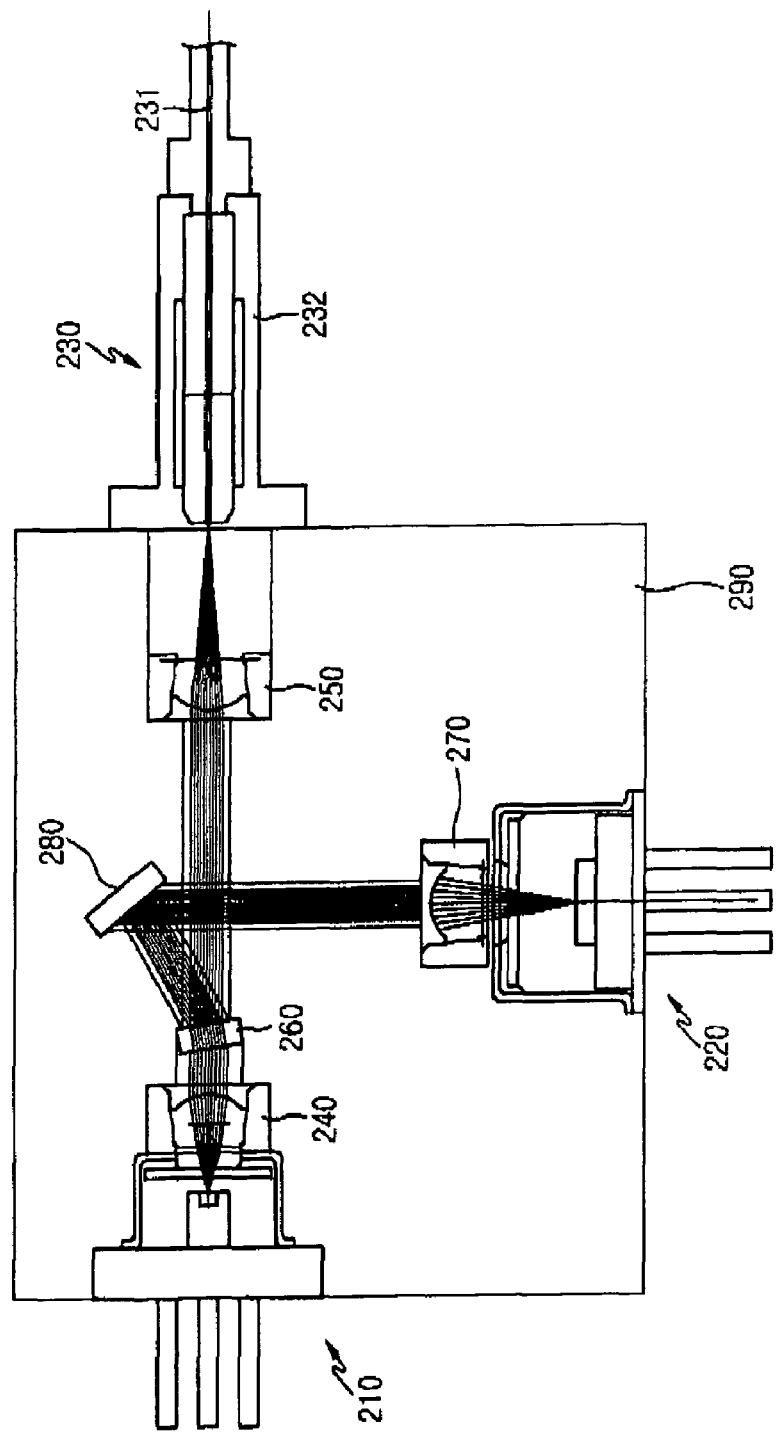
FIG. 2 is a schematic diagram illustrating the configuration of another conventional bi-directional optical transceiver module.
Figure 3:
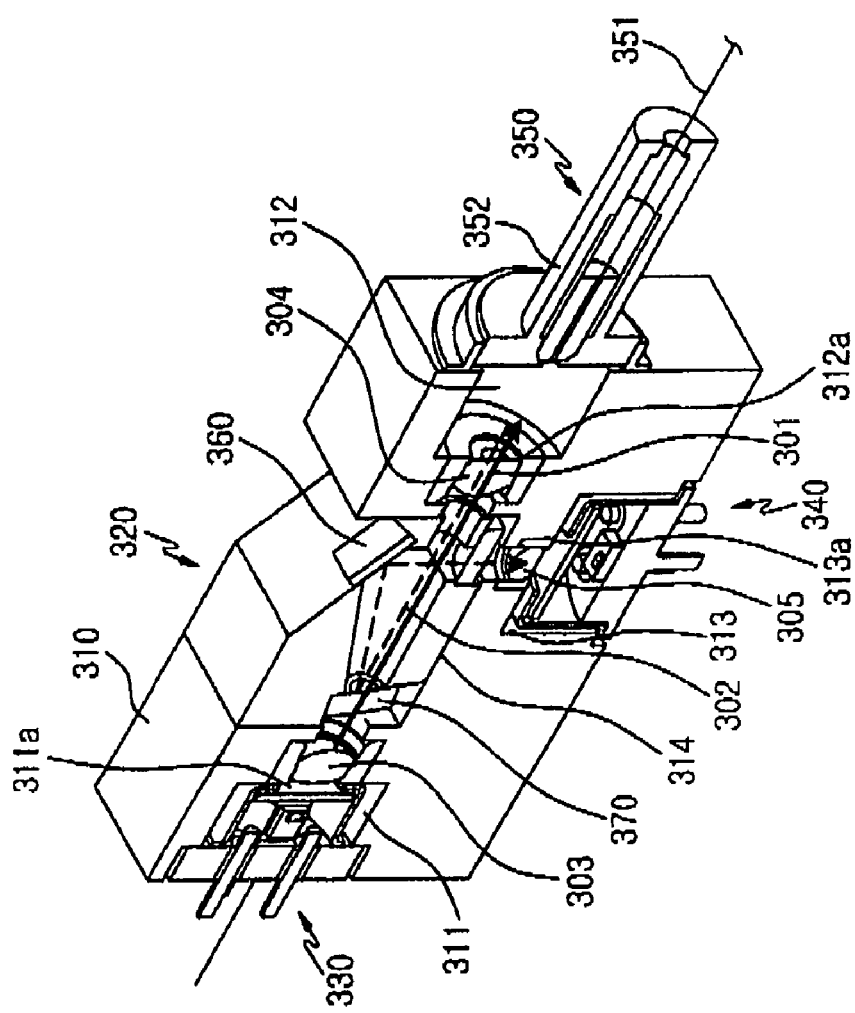
FIG. 3 is a schematic diagram illustrating the configuration of a bi-directional optical transceiver module according to a first embodiment of the present invention.

FIG. 3 is a schematic diagram illustrating the configuration of a bi-directional optical transceiver module according to a first embodiment of the present invention. As shown in FIG. 3, the bi-directional optical transceiver module includes a housing 310, an optical transmitter 330, which has a TO-can structure, that generates a first optical signal 301, and an optical receiver 340, which has a TO-can structure, that detects a second optical signal 302. The bi-directional optical transceiver module also includes an optical fiber ferrule 350, a block 320, and first through third lens systems 303, 304, and 305.

The housing 310 has a first receiving section 311 provided at one side of the housing 310 to receive the optical transmitter 330, a second receiving section 312 provided at the other side of the housing 310 to be opposite to the first receiving section 311, and a third receiving section 313 provided at a lower portion of the housing 310 between the first and second receiving sections 311 and 312 to receive the optical receiver 340. and the housing 310 also has a fourth receiving section 314 provided at an upper portion of the housing 310 to be opposite to the third receiving section 313. The housing 310 is also provided with holes 311a, 312a, and 313a to communicate the first through fourth receiving sections 311, 312, 313, and 314.

The holes 311a, 312a, and 313a are arranged on optical paths, along which the first and second optical signals 301 and 302 travel. Accordingly, the first and second optical signals 301 and 302 can be input to and output from the first through fourth receiving sections 311, 312, 313 and 314 through the interior of the housing 310.

The optical fiber ferrule 350 is received in the second receiving section 312. The optical fiber ferrule 350 includes an optical fiber 351 to input the second optical signal 302 into the interior of the bi-directional optical transceiver module and to output the first optical signal 301 to the outside of the bi-directional optical transceiver module. The optical fiber ferrule 350 also includes a stub 352 fitted in the second receiving section 312 to support the optical fiber 351.

Figure 4:
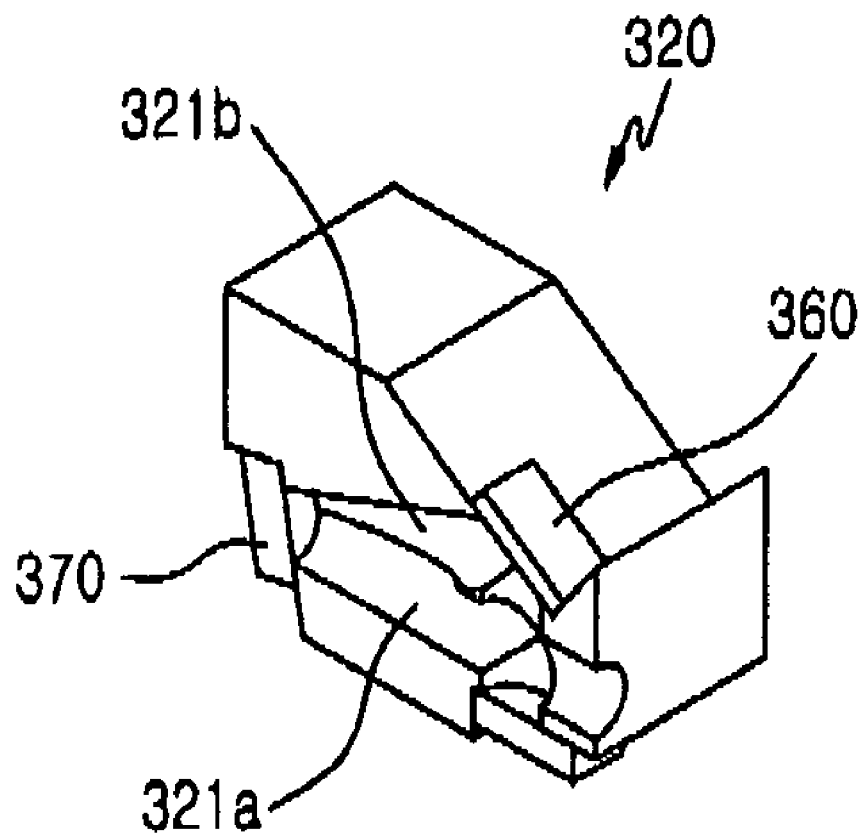
FIG. 4 is a perspective diagram illustrating a block shown in FIG. 3.

FIG. 4 is a perspective diagram illustrating the block 320 shown in FIG. 3. As shown in FIG. 4, the block 320 is received in the fourth receiving section 314 of the housing 310 to support a filter 370 and a mirror 360. The filter 370 receives the second optical signal 302 from the optical fiber 351, and reflects the second optical signal 302 at a predetermined angle with respect to the optical path of the first optical signal 301. The angle of mirror 370 is determined by filtering wavelength specification, however usually more than 0 degree to below 45 degrees. The mirror 360 reflects the second optical signal 302 reflected from the filter 370 to the optical receiver 340. The block 320 is fitted in the fourth receiving section 314 of the housing 310 in a state in which the filter 370 and mirror 360 are aligned with each other with respect to optical axes thereof. Since the block 320 is assembled in the housing 310, as described above, it is possible to easily perform the optical axis alignment and test of the filter 370 and mirror 360, as compared to the conventional devices described above.

The block 320 may have a structure including guides 321a and 321b respectively arranged on the optical paths of the first and second optical signals 301 and 302 to guide the first and second optical signals 301 and 302.

For the filter 370, a wavelength division multiplexing (WDM) filter may be used. The filter 370 is arranged on the block 320 in a state of being aligned with respect to the optical axis thereof such that the faces of the filter 37, to which the first and second optical signals 301 and 302 are incident, have predetermined angles with respect to the optical path of the first optical signal 301, respectively.

The first lens system 303 is mounted to the housing 310 between the optical transmitter 330 and the filter 370. The first optical signal 301 collimates the first optical signal 301, and outputs the collimated first optical signal 301 to the filter 370.

The second lens system 304 is mounted in the housing 310 between the optical fiber ferrule 350 and the filter 370. The second lens system 304 converges the first optical signal 301 to one end of the optical fiber 351. The second lens system 304 also collimates the second optical signal 302 received from the optical fiber 351, and outputs the collimated second optical signal 302 to the filter 370.

The third lens system 305 is mounted in the housing 310 between the optical receiver 340 and the mirror 360 to converge the second optical signal 302 to the optical receiver 340. The mounting of the first through third lens systems 303, 304, and 305 to the housing 310 are achieved using support members, respectively.

The first, second and third lens systems, 303, 304 and 305, are preferably fixedly mounted on the housing 310.

Figure 5:
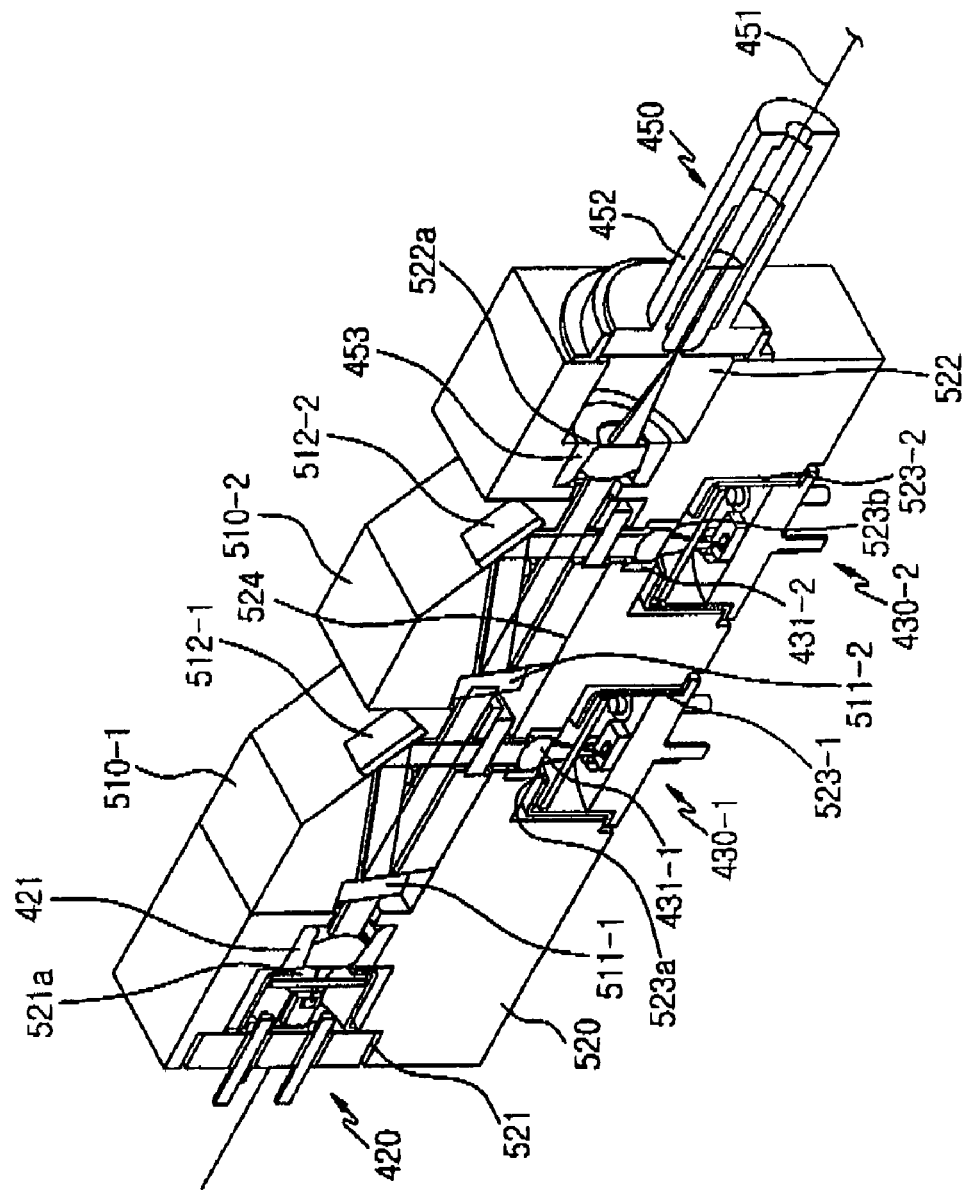
FIG. 5 is a schematic diagram illustrating the configuration of a bi-directional optical transceiver module according to a second embodiment of the present invention.

FIG. 5 is a schematic diagram illustrating the configuration of a bi-directional optical transceiver module according to a second embodiment of the present invention. As shown in FIG. 5, the bi-directional optical transceiver module includes a housing 520, an optical transmitter 420, which has a TO-can structure, that generates a first optical signal, one or more optical receivers, two optical receivers 430-1 and 430-2 in the illustrated case, each of which has a TO-can structure, that detects an associated channel of a second optical signal, which consists of a plurality of channels with different wavelengths, an optical fiber ferrule 450, and one or more blocks, two blocks 510-1 and 510-2 in the illustrated case. The second embodiment of the present invention implements a bi-directional optical transceiver module may be applicable, for example, when the second optical signal consists of a plurality of channels with different wavelengths, in order to detect each channel of the second optical signal, based on the associated wavelength.

The housing 520 has first through fourth receiving sections 521, 522, 523-1, 523-2, and 524 to receive the optical transmitter 420, optical receivers 430-1 and 430-2, and optical fiber ferrule 450, respectively. The housing 520 is also provided with holes 521a, 522a, 523a, and 523b to communicate the first through fourth receiving sections 521, 522, 523-1, 523-2, and 524.

The first receiving section 521 is provided at one side of the housing 520 to receive the optical transmitter 420. The second receiving section 522 is provided at the other side of the housing 520 to be opposite to the first receiving section 521. The third receiving sections 523-1 and 523-2 correspond to the optical receivers 430-1 and 430-2, respectively.

Each of the third receiving sections 523-1 and 523-2 is provided at a lower portion of the housing 520 to receive a corresponding one of the optical receivers 430-1 and 430-2. The fourth receiving section 524 is provided at an upper portion of the housing 520 to be opposite to the third receiving sections 523-1 and 523-2. Each of the optical receivers 430-1 and 430-2 receives an associated one of the blocks 510-1 and 510-2.

Each of the optical receivers 430-1 and 430-2 has a TO-can structure, and detects an associated one of the channels of the second optical signal.

The blocks 510 and 510-2 are received in the fourth receiving section 524 of the housing 520 to support filters 511-1 and 511-2 and mirrors 512-1 and 512-2. Each of the filters 511-1 and 511-2 outputs the first optical signal to the second receiving section 522, and reflects the associated channel of the second optical signal received via the optical fiber 451 at a predetermined angle with respect to the optical path of the first optical signal. The angle of mirrors 511-1, 511-2 is determined by filtering wavelength specification, however usually more than 0 degree to below 45 degrees. Each of the mirrors 512-1 and 512-2 reflects the second optical signal reflected from the associated one of the filters 511-1 and 511-2 to the associated one of the optical receiver 430-1 and 430-2. In this embodiment, the bi-directional optical transceiver module may have a structure including blocks of a number corresponding to the number of different-wavelength channels forming the second optical signal, and optical receivers respectively corresponding to the blocks.

As discussed above, the bi-directional optical transceiver module is configured by integrating a filter and a mirror in a single block, and assembling the block in a housing, in which an optical fiber ferrule is integrated. As a result of this structure, the optical axis alignment of the filter and mirror can be easily achieved, as compared to the conventional devices discussed above. Also, since the filter and mirror is integrated in the block, which has a separate structure, it is possible to easily cope with generation of poor-quality products. In addition, each element can be easily tested, as compared to the conventional devices discussed above.

It is to be understood that the invention is not limited to the disclosed embodiments, but, on the contrary, it is intended to cover various modifications within the spirit and scope of the appended claims.

What is claimed is:

1. A bi-directional optical transceiver module comprising:
an optical transmitter, which has a TO-can structure, that generates a first optical signal;
a plurality of optical receivers, which has a TO-can structure, that detects a second optical signal;
a housing having a first receiving section that receives the optical transmitter, a second receiving section arranged to be opposite to the first receiving section, a third receiving section arranged below the first and second receiving sections to receive the optical receiver, a fourth receiving section arranged to be opposite to the third receiving section, and holes formed in the housing to communicate the first through fourth receiving sections;
an optical fiber ferrule received in the second receiving section, the optical fiber ferrule including an optical fiber that inputs the second optical signal into the bi-directional optical transceiver module and outputs the first optical signal from the bi-directional optical transceiver module; and a plurality of blocks arranged in a path of the second optical signal, each of the blocks being received in the fourth receiving section that supports a filter to output the first optical signal to the second receiving section and reflects the second optical signal received from the optical fiber at a predetermined angle with respect to an optical path of the first optical signal, and supports a mirror to reflect the second optical signal reflected from the filter to the optical receiver;

wherein a number of said plurality of blocks corresponds to a number of different-wavelength channels forming the second optical signal, and optical receivers respectively corresponding to the blocks.

2. The bi-directional optical transceiver module according to claim 1, wherein the optical fiber ferrule further comprises:

a stub to support the optical fiber such that the optical fiber is maintained in a fixed state in the second receiving section.

3. The bi-directional optical transceiver module according to claim 1, wherein the filter comprises a wavelength division multiplexing filter.

4. The bi-directional optical transceiver module according to claim 1, wherein each block of said plurality of blocks is provided with guides respectively arranged on the optical path of the first optical signal and an optical path of the second optical signal to guide the first and second optical signals.

5. The bi-directional optical transceiver module according to claim 1, further comprising:

a first lens system in the housing between the optical transmitter and the filter that collimates the first optical signal and to output the collimated first optical signal to the filter;

a second lens system in the housing between the optical fiber ferrule and the filter that converge the first optical signal to one end of the optical fiber, that collimate the second optical signal received from the optical fiber, and outputs the collimated second optical signal to the filter; and a third lens system in the housing between the optical receiver and the mirror to converge the second optical signal to the optical receiver.

6. A bi-directional optical transceiver module comprising:

an optical transmitter, which has a TO-can structure, that generates a first optical signal;

one or more optical receivers, which have a TO-can structure, that detects second optical signals of different wavelengths, respectively;

a housing having a first receiving section that receives the optical transmitter, a second receiving section arranged to be opposite to the first receiving section, a third receiving section arranged below the first and second receiving sections that receives the optical receivers, a fourth receiving section arranged to be opposite to the third receiving section, and holes that communicate the first through fourth receiving sections;

an optical fiber ferrule received in the second receiving section, the optical fiber ferrule including an optical fiber that inputs the second optical signals into the bi-directional optical transceiver module and outputs the first optical signal from the bi-directional optical transceiver module; and at least two blocks arranged in a path of the second optical signals, each block being received in the fourth receiving section that support a filter to output the first optical signal to the second receiving section and respectively reflect an associated one of the second optical signals received from the optical fiber at a predetermined angle with respect to an optical path of the first optical signal, and supports a mirror to reflect the associated second optical signal reflected from the filter to an associated one of the optical receivers, and wherein a number of said at least two blocks corresponds to a number of different-wavelength channels forming the second optical signal, and optical receivers respectively corresponding to the blocks.

7. The bi-directional optical transceiver module according to claim 6, further comprising:

a first lens system in the housing between the optical transmitter and the filter associated with a corresponding one of the blocks that collimates the first optical signal and outputs the collimated first optical signal to the associated filter;

a second lens system in the housing between the optical fiber ferrule and the associated filter that converges the first optical signal to one end of the optical fiber, collimates an associated one of the second optical signals received from the optical fiber, and output the collimated second optical signal to the associated filter; and one or more third lens systems in the housing between an associated one of the optical receivers and the mirror associated with a corresponding one of the blocks of said at least two blocks that converges the second optical signal to the associated optical receiver.

8. A bi-directional optical transceiver nodule comprising:

a housing having a plurality of holes;

an optical transmitter having a TO-can structure, mounted in the housing, that generates a first optical signal;

an optical receiver having a TO-can structure, mounted in the housing, that detects a second optical signal, wherein the plurality of holes are arranged on optical paths, along which the first and second optical signals travel;

an optical fiber ferrule, mounted in the housing, the optical fiber ferrule including an optical fiber that inputs the second optical signal into the bi-directional optical transceiver module and outputs the first optical signal from the bi-directional optical transceiver module; and at least two blocks arranged in a path of the second optical signals and mounted in the housing, that supports a filter to output the first optical signal to the second receiving section and reflects the second optical signal received from the optical fiber at a predetermined angle with respect to an optical path of the first optical signal, and supports a mirror to reflect the second optical signal reflected from the filter to the optical receivers;

wherein a number of said at least two blocks corresponds to a number of different-wavelength channels forming the second optical signal, and optical receivers respectively corresponding to the blocks.

9. The bi-directional optical transceiver module according to claim 8, wherein the optical fiber ferrule a stub to support the optical fiber.

10. The bi-directional optical transceiver module according to claim 8, wherein the filter comprises a wavelength division multiplexing filter.

11. The bi-directional optical transceiver module according to claim 8, wherein each block of said at least two blocks is provided with guides respectively arranged on the optical path of the first optical signal and an optical path of the second optical signal to guide the first and second optical signals.

12. The bi-directional optical transceiver module according to claim 8, further comprising:
    a first lens system in the housing between the optical transmitter and the filter that collimates the first optical signal and to output the collimated first optical signal to the filter;
    a second lens system in the housing between the optical fiber ferrule and the filter that converge the first optical signal to one end of the optical fiber, that collimate the second optical signal received from the optical fiber, and outputs the collimated second optical signal to the filter; and
    a third lens system in the housing between the optical receiver and the mirror to converge the second optical signal to the optical receiver.

13. The bi-directional optical transceiver module according to claim 12, wherein the first, second and third lens systems are fixedly mounted in the housing.

* * * * *